S. T. SAVAGE.
Coffee Pot.
No. 91,274.
Patented June 15, 1869.
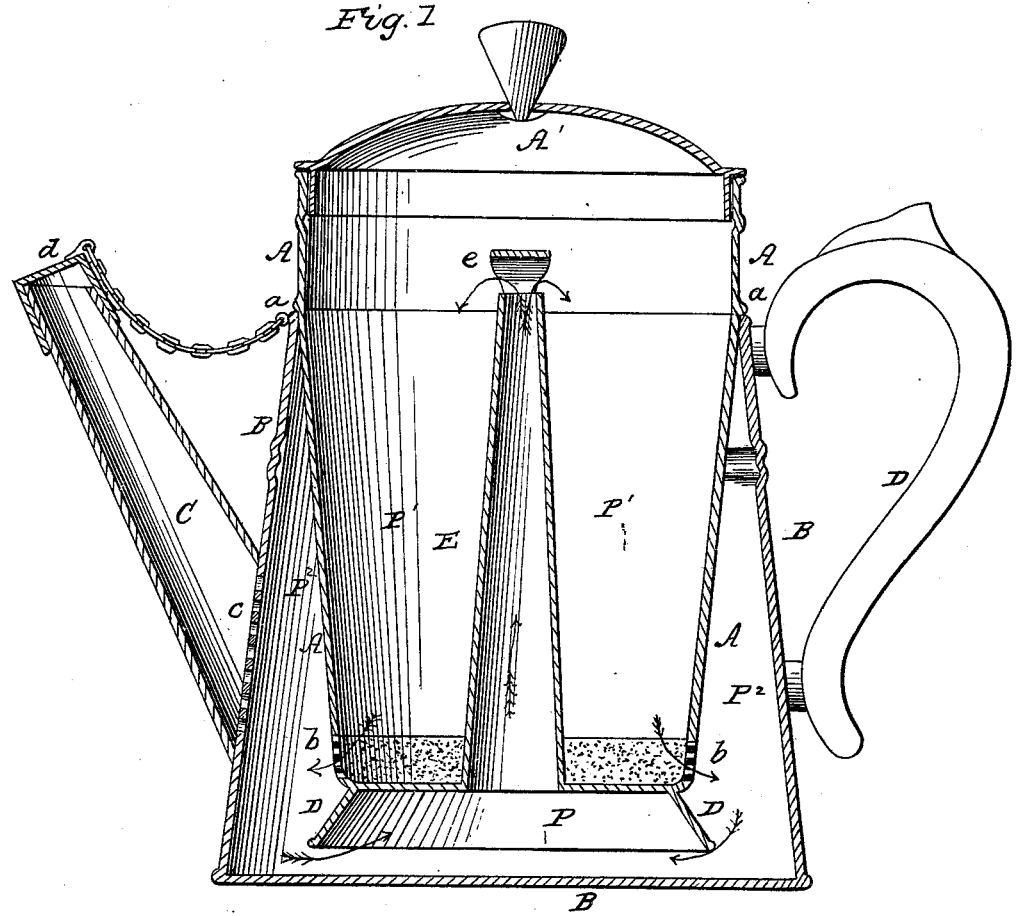

United States Patent Office.

SILAS T. SAVAGE, OF GREENBUSH, NEW YORK, ASSIGNOR TO HIMSELF AND JOHN S. PERRY, EXECUTOR AND TRUSTEE.

Letters Patent No. 91,274, dated June 15, 1869.

COFFEE-POT.

The Schedule referred to in these Letters Patent and making part of the same.

*To all whom it may concern:*

Be it known that I, SILAS T. SAVAGE, of the town of Greenbush, in the county of Rensselaer, and State of New York, have invented a new and improved Method of Extracting the Essential Properties from Vegetable Substances; and I do hereby declare that the following is a full, clear, and exact description thereof, reference being had to the accompanying drawings, making a part of this specification, in which—

Figure 1 is a diametrical section through one form of vessel adapted for use in conducting the improved process.

This invention relates to a new and improved process or method of extracting the essential properties from coffee, tea, hops, tan-bark, dye-woods, and other vegetable substances; and consists in subjecting the substances to be treated to the action of boiling water, in such manner as to induce the water to circulate violently and repeatedly through a vessel containing such substances, and also through an external casing of said vessel, to which heat is applied, as will be hereinafter explained.

To enable others skilled in the art to understand my invention, I will describe one practical mode of carrying it into effect.

For the purpose of illustrating one mode of conducting my improved process, I have represented, in the accompanying drawings, a vessel adapted for extracting the essence from coffee or tea; but for extracting the strength from tan-bark, hops, or other vegetable substances, in large quantities, such vessels may be made of a shape and capacity adapted to serve the purpose required of them.

The general principle of construction of the vessels will remain the same, whether they be made very large or small, and therefore the following description of the coffee or tea-pot shown in the drawings will enable others skilled in the art to fully understand my invention, the method of conducting the improved process.

The body B, the spout C, and the handle D of the coffee-pot, may be constructed in the usual or any other suitable manner, and within this pot a vessel A is suspended, by its annular rib $a$, or in any other manner which will answer the end in view.

This vessel A has an inverted cup-shaped or downwardly-flaring bottom, D, the lower, flaring end of which extends down nearly to the bottom of the pot B, and forms a chamber, P, through which the liquid will rise during the process of extraction.

Instead of having vessel A suspended as described, it may be supported upon the bottom of the external vessel B, and openings made through the lower edge of the flange D, for allowing liquid to flow freely into chamber P from the external chamber $P^2$.

The upper cylindrical portion of the vessel A rises above the upper end of vessel B a suitable distance, and receives upon it a cover, A', as shown.

Below the rib $a$, the vessel A is made tapering, and forms, in conjunction with the opposite wall of the vessel B, a chamber, $P^2$, which communicates, at its lower end, with the chamber P, through the annular passage left beneath the bottom edge of the flange D, as shown, and which also communicates with the internal chamber $P^1$, through perforations $b$, made through the wall A.

The drawing shows the perforations made through and surrounding the space enclosed by wall A; but if desired, a strainer or reticulated plate, or its equivalent, may be arranged within the wall A, in a horizontal plane, in which case openings larger than those shown will be made through wall A below said strainer.

In the centre of the imperforated bottom of vessel A rises, to a suitable height in chamber $P^1$, a pipe, E, which is capped by a hood or deflector, $e$, and which may be made smallest at its upper end, as shown.

The deflector $e$ is designed for directing the current of liquid escaping from the upper end of tube E downwardly into chamber $P^1$, upon the substance placed therein.

This pipe E forms a passage, for the liquid to rise through it from the chamber P, and pour over in a thin sheet into chamber $P^1$, above the substance which is being treated, and therefore I extend said pipe nearly to the top of vessel A.

For larger vessels than a coffee-pot, more than one of the pipes E may be used, and the vessels A B may be made of cylindrical, rectangular, or any other suitable shape.

Heat may be applied either directly to the external surface of the bottom of vessel B, or to the interior of this vessel, by steam-pipes arranged therein.

Operation.

The substance to be treated is put into the chamber $P^1$, and a sufficient quantity of water poured therein, which will rise and find its level in the chamber $P^2$.

Heat is then applied in any suitable manner, and when the water is thereby expanded in the chamber P, this water will be forced up through the pipe E, and poured into the inner chamber $P^1$, as indicated by the arrows.

The current of water from the chamber P, ascending through the pipe E, will tend to create a vacuum in said chamber, which is filled by drawing from the outer chamber $P^2$, through the space beneath flange D.

The draught from this outer chamber $P^2$ tends to form a vacuum therein, which, in its turn, draws from the inner chamber $P^1$, through the strainer $b$. Thus it will be seen that the currents of water will take the course indicated by the arrows in the drawings, and the same water will be repeatedly caused to pass rapidly through the substance in chamber $P^1$, in a downward direction, which will quickly and thoroughly extract from such substance its essential properties.

I do not claim the devices shown in Letters Patent granted to E. F. Woodward, March 25, 1862; nor do I claim the devices shown in the Letters Patent granted to E. F. Woodward, June 4, 1867; but having described my invention,

What I claim as new, and desire to secure by Letters Patent, is—

1. The removable vessel A, constructed with a flanged bottom, D, a pipe, E, rising from the bottom, and perforations $b$ through its side, in combination with an external casing, B, substantially as described.

2. The vessel A, provided with a cover, A', and otherwise constructed substantially as set forth, in combination with a chamber, $P^2$, formed as described.

SILAS T. SAVAGE.

Witnesses:
AMASA J. PARKER,
AMASA J. PARKER, Jr.